United States Patent
Murata

(10) Patent No.: US 8,036,081 B2
(45) Date of Patent: Oct. 11, 2011

(54) OPTICAL DISK DEVICE AND OPTICAL DISK PROCESSING SYSTEM HAVING OPTICAL DISK DEVICE

(75) Inventor: Tatsuya Murata, Tokorozawa (JP)

(73) Assignee: TEAC Corporation, Tama-shi, Tokyo (JP)

( * ) Notice: Subject to any disclaimer, the term of this patent is extended or adjusted under 35 U.S.C. 154(b) by 173 days.

(21) Appl. No.: 12/479,677

(22) Filed: Jun. 5, 2009

(65) Prior Publication Data

US 2009/0323484 A1 Dec. 31, 2009

(30) Foreign Application Priority Data

Jun. 25, 2008 (JP) ................................. 2008-166048

(51) Int. Cl.
*G11B 19/28* (2006.01)
(52) U.S. Cl. .................... 369/53.3; 369/30.36; 369/53.2
(58) Field of Classification Search .................. None
See application file for complete search history.

(56) References Cited

U.S. PATENT DOCUMENTS

| | | | |
|---|---|---|---|
| 4,687,542 A | 8/1987 | Davis et al. | |
| 4,966,519 A | 10/1990 | Davis et al. | |
| 5,044,871 A | 9/1991 | Davis et al. | |
| 6,901,039 B1 | 5/2005 | Sugie et al. | |
| 7,149,169 B2 | 12/2006 | Juan et al. | |
| 2001/0009534 A1 | 7/2001 | Sato | |
| 2005/0073925 A1* | 4/2005 | Juan .............................. | 369/53.2 |
| 2009/0323490 A1 | 12/2009 | Murata | |

FOREIGN PATENT DOCUMENTS

| | | |
|---|---|---|
| DE | 600 20 949 T2 | 5/2006 |
| JP | 6029369 A | 2/1994 |
| JP | 2001283498 A | 10/2001 |
| JP | 2004095064 A | 3/2004 |
| JP | 2004-164796 A | 6/2004 |
| JP | 3797318 B2 | 7/2006 |
| WO | 00/63897 A1 | 10/2000 |

OTHER PUBLICATIONS

Machine translation of JP 3797318 B2 into English; Kitaoka et al.*
English Language translation of German Office Action dated May 5, 2010, relating to German Patent Application No. 10 2009 026 030.7-55, 2 pages.
German Office Action dated May 5, 2010, relating to German Patent Application No. 10 2009 026 030.7-55, 3 pages.
German Office Action dated Aug. 5, 2011, relating to German Patent Application No. 10 2009 026 031.5, 10 pages (with English Translation).

* cited by examiner

*Primary Examiner* — Wayne Young
*Assistant Examiner* — Brian Butcher
(74) *Attorney, Agent, or Firm* — Seed IP Law Group PLLC

(57) ABSTRACT

An optical disk processing system having a recording unit and a printing unit is provided. The optical disk processing system comprises a printing unit and a recording unit. A drive controller of the recording unit rotationally drives a loaded optical disk (D) and detects whether or not a rotational speed is reduced during acceleration. When the rotational speed is reduced, it is judged that a stick-slip has occurred and loading of a plurality of the optical disks (D) is detected.

5 Claims, 4 Drawing Sheets

OPTICAL DISK DEVICE AND OPTICAL DISK PROCESSING SYSTEM HAVING OPTICAL DISK DEVICE

PRIORITY INFORMATION

This application claims priority to Japanese Patent Application No. 2008-166048, filed on Jun. 25, 2008, which is incorporated herein by reference in its entirety.

BACKGROUND

1. Technical Field

The present invention relates to an optical disk device and an optical disk processing system having the optical disk device, and in particular to loading of an optical disk in an optical disk device.

2. Related Art

When a CD or a DVD is mass-produced, the manufacturing cost is reduced by using a large-scale device having a disk changer. On the other hand, an optical disk processing system is proposed in which a recording unit which writes information on the optical disk, a printing unit which prints on a label surface of the optical disk, and a disk changer are integrated, in order to handle the cases of custom-made optical disks which do not require mass production such as, for example, school learning materials, commemorative items, presents, etc. In this optical disk processing system, a sequence of processes are automatically executed in which an optical disk which is not yet processed is transported from a stocker to a recording unit and loaded, data is recorded by the recording unit, the recorded optical disk is ejected, the recorded optical disk is transported to the printing unit and a print is applied on the label surface, and the printed optical disk is again transported back to the stacker.

Japanese Patent No. 3797318 discloses an optical disk processing system in which a recording unit, a printing unit, and a disk changer are integrated.

In the optical disk processing system, the optical disks must be taken out from the stocker one by one, transported to the recording unit, and loaded. However, depending on the surface state of the optical disk, the optical disks may stick to each other, and a plurality of optical disks may be transported to the recording unit together and loaded. The optical disk loaded on the tray of the recording unit is normally clamped by a magnetic damper and is rotationally driven by a spindle. However, when a plurality of optical disks are loaded in the stuck state, the clamping force of the magnetic damper is weakened by the thickness of the plurality of stacked optical disks and the optical disk cannot be firmly clamped, and as a result, the rotational control becomes unstable, or the control cannot be achieved when the number of rotations is increased and the optical disk vibrates. Therefore, when a plurality of optical disks are loaded, this phenomenon must be quickly detected.

SUMMARY

The present invention advantageously provides an optical disk device and an optical disk processing system having the optical disk device which can quickly and reliably detect that a plurality of optical disks are loaded.

According to one aspect of the present invention, there is provided an optical disk device comprising a unit which rotationally drives a loaded optical disk, and a unit which detects that there are a plurality of loaded optical disks by detecting that a stick-slip has occurred in the optical disk on the basis of a change over time of a rotational speed.

According to another aspect of the present invention, it is preferable that, in the optical disk device, the detecting unit detects that the stick-slip has occurred when the rotational speed is reduced during acceleration.

According to another aspect of the present invention, there is provided an optical disk processing system comprising the optical disk device and a printing unit which prints on a label surface of the optical disk, wherein the system consecutively processes data recording at the optical disk device and label surface printing at the printing unit.

According to another aspect of the present invention, there is provided an optical disk processing system comprising a plurality of the optical disk devices and a transporting mechanism which transports an optical disk to each of the plurality of the optical disk devices in a predetermined order.

DETAILED DESCRIPTION

A preferred embodiment of the present invention will now be described with reference to the drawings.

Figure 1:
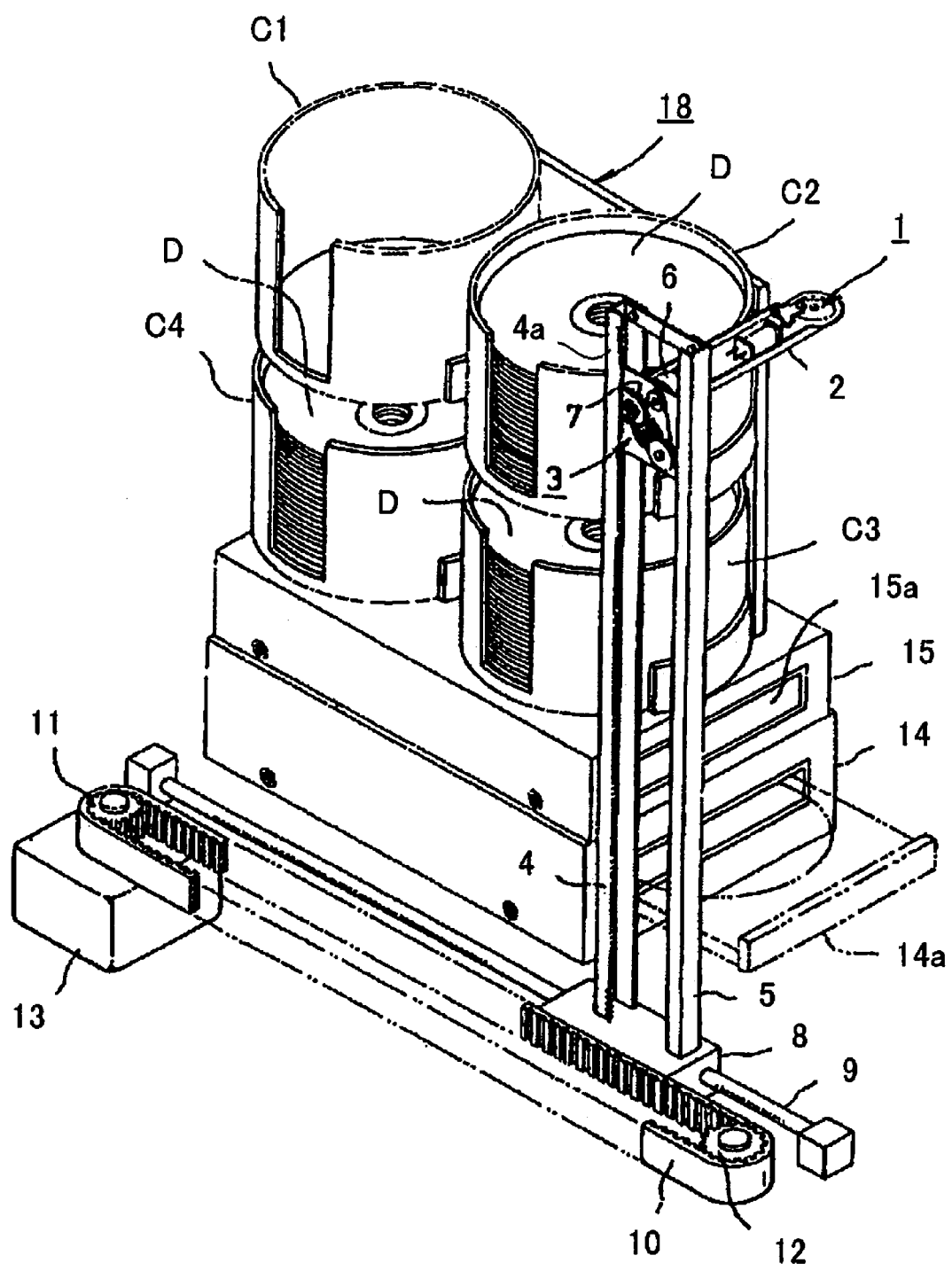
FIG. 1 is an overview of an optical disk processing system according to a preferred embodiment of the present invention.

FIG. 1 shows an overview of an optical disk processing system having an optical disk device according to a preferred embodiment of the present invention. On an upper surface of a ceiling plate of a recording unit 15 which is an optical disk device, a plurality of cases C1, C2, C3, and C4 for storing an optical disk D and having a same volume are placed. These cases C1, C2, C3, and C4 are supported by a support structure 18 placed at the back of the cases, and are configured to be detachable from the support structure 18. In the placement state of the cases C1, C2, C3, and C4 shown in FIG. 1, the case C1 is set as a collection case and cases C2, C3, and C4 are set as stock cases, and a predetermined number of optical disks which are not yet processed are stored in the cases.

A clamp unit 1 is for clamping a center hole of the optical disk D, and is provided on a transport arm 2. One end of the transport arm 2 is fixed on an elevation mechanism 3. The elevation mechanism 3 is supported by support columns 4 and 5, a driving force of an output shaft of a motor 6 is transmitted to a gear 7 through a pulley, the elevation mechanism 3 is moved up and down along a vertical direction by engagement of the gear 7 with a rack gear 4a of the support column 4, and the transport arm 2 is moved up and down.

An end of the supports 4 and 5 is fixed on a slider block 8 which is supported in a slidable manner on a guide shaft 9. The slider block 8 is also connected and fixed on a belt 10 which is provided in a stretched manner between wheels 11 and 12. With the belt 10 driven by a motor 13, the slider block 8, the support columns 4 and 5, and the transport arm 2 move back and forth in a horizontal direction.

A printing unit 14 prints on a label surface of the optical disk D loaded by a disk tray 14a. The recording unit 15 records information on an optical disk D which is loaded by a disk tray 15a.

In the transporting of the optical disk D among the cases, printing unit 14, and recording unit 15, the transporting of the optical disk D in the upward and downward directions is achieved by the elevation mechanism 3 and the transporting in the horizontal direction is achieved by driving the belt 10.

In the process of the optical disk D, a control program is configured so that the optical disks are processed for each of the cases C2, C3, and C4 which are stock cases, and a system processor which controls an operation of the overall system executes the control program. First, an optical disk D at an uppermost layer of the case C2 is clamped by the click clap unit 1, and is sequentially transported to the printing unit 14 and the recording unit 15 and subjected to predetermined processes. After the predetermined processes are completed, the processed optical disk D is stored in the case C1 which is the collection case. After the optical disks D of the case C2 are sequentially processed and the case C2 is emptied of the optical disks D, the control program at this point judges to set the case C2 as the collection case. As the process is continued, after the predetermined processes are applied to the optical disks D which are stored in the case C3 and which are not yet processed, the optical disks D are stored in the case C2 which is now set as a collection case. Then, similar processes are repeated.

In the above description, for an optical disk D, first the printing unit prints on the label surface, and then the recording unit 15 records the data. However, the present invention is not limited to such a configuration, and it is also possible to employ a configuration, for example, in which the optical disk D taken out from the case is first transported to the recording unit 15, data is recorded by the recording unit 15, and then the printing unit 14 prints on the label surface. In the present embodiment, a configuration is described in which the optical disk is first transported to the recording unit 15 after the optical disk is taken out from the case and loaded into the recording unit 15.

Figure 2:
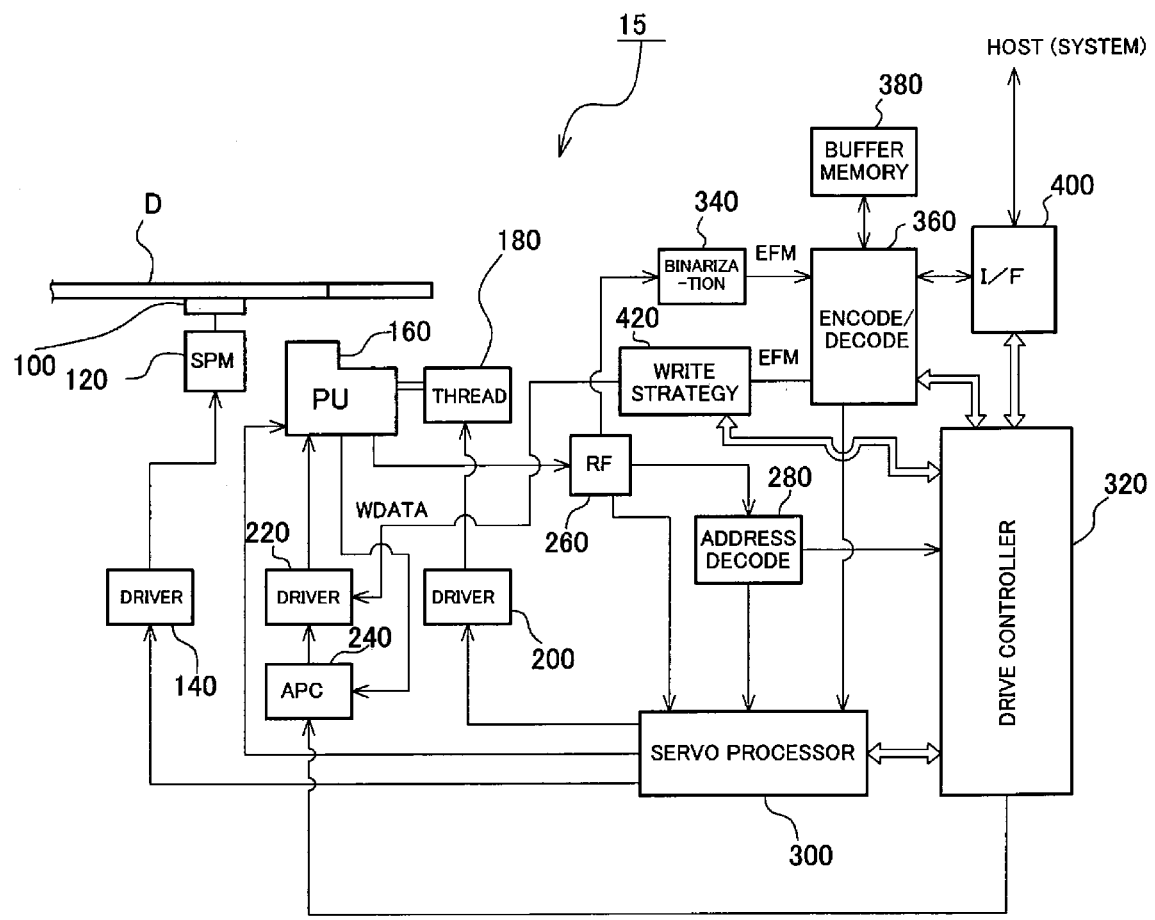
FIG. 2 is a structural diagram of an optical disk device (recording unit).

FIG. 2 shows a structure of the recording unit 15 as an optical disk device. The optical disk D which is transported by the transport arm 2 and which is loaded by the tray 15a is clamped by a magnetic clamper (not shown), is placed on a turntable 100, and is rotationally driven by a spindle motor (SPM) 120 along with the turntable 100. The spindle motor SPM 120 is driven by a driver 140, which is servo-controlled by a servo processor 300 so that the spindle motor SPM 120 has a desired rotational speed.

An optical pickup 160 comprises a laser diode (LD) for irradiating laser light on the optical disk D and a photodetector (PD) which receives reflected light from the optical disk D and converts into an electric signal, and is placed opposing the optical disk D. The optical pickup 160 is driven in a radial direction of the optical disk D by a thread motor 180 which is driven by a driver 200. The driver 200 is servo-controlled by the servo processor 300 similar to the driver 140. In addition, the LD of the optical pickup 160 is driven by a driver 220, and in the driver 220, a drive current is controlled by an automatic power control circuit (APC) 240 so that the laser power is at a desired value. The APC 240 and the driver 220 control the amount of light emission of the LD using an instruction from a system controller 320. In FIG. 2, the driver 220 is provided separately from the optical pickup 160, but the driver 220 may alternatively be equipped in the optical pickup 160.

When data is recorded on the optical disk D, data to be recorded which is supplied from the system is supplied through an interface I/F 400 to an encode/decode circuit 360. The encode/decode circuit 360 stores the data to be recorded in a buffer memory 380, encodes the data to be recorded into modulated data, and supplies the modulated data to a write strategy circuit 420. The write strategy circuit 420 converts the modulated data into multi-pulses (a pulse train) according to a predetermined recording strategy, and supplies as recording data to the driver 220. Because the recording strategy affects the recording quality, the recording strategy is normally fixed to a certain optimum strategy. Laser light having power modulated by the recording data is irradiated from the LD of the optical pickup 160 and data is recorded on the optical disk D. After the data is recorded, the optical pickup 160 irradiates laser light of replay power to replay the recording data and supplies to an RF circuit 260. The RF circuit 260 supplies the replay signal to a binarization circuit 340, and binarized data is supplied to the encode/decode circuit 360. The encode/decode circuit 360 decodes the modulated data, and matches with the recording data stored in the buffer memory 380. The result of the matching is supplied to the drive controller 320. The drive controller 320 determines whether the data continues to be recorded or if an exchange process is to be executed based on the result of the matching.

Figure 3:
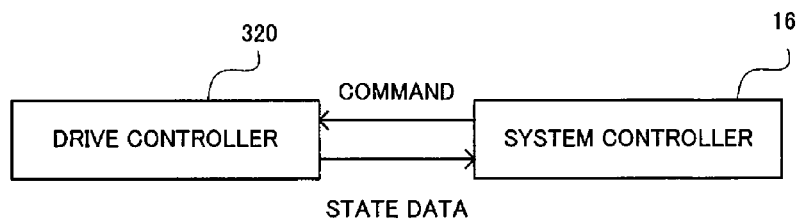
FIG. 3 is a diagram for explaining data exchange between a system controller and a drive controller.

In such a structure, commands and data are exchanged between a system controller 16 which controls the overall system shown in FIG. 1 and the drive controller 320 which controls the recording unit 15 shown in FIG. 2. As shown in FIG. 3, the system controller 16 transmits a start command and an end command for data recording to the drive controller 320, and the drive controller 320 transmits data related to completion of data recording and the state of the recording unit 15.

The optical disks D are transported by the transport arm 2 one by one. However, depending on the state of the surface of the optical disk D, a plurality of optical disks D, for example, two optical disks D, may be transported together in a state of being stuck close together. In this case, the plurality of optical disks D are loaded to the recording unit 15, but because the clamping force of the magnetic damper is weakened, the plurality of optical disks D cannot be firmly clamped. As a result, when the optical disk D is rotationally driven at a high speed by the spindle motor 120, because the optical disks are not sufficiently clamped, the plurality of optical disks D would slip. In this state, the data cannot be normally recorded, and because the optical disk D slips, the spindle motor 120 reaches a predetermined rotational speed in a shorter period of time than in the normal case, resulting in an erroneous judgment that the optical disk D is not yet loaded and transmission of this determination to the system controller 16, and consequently, the system controller 16 taking out a new optical disk D from the case and transporting it to the recording unit 15.

In consideration of this, the drive controller 320 of the present embodiment quickly and reliably detects that a plurality of optical disks D are loaded through the following process.

Figure 4:
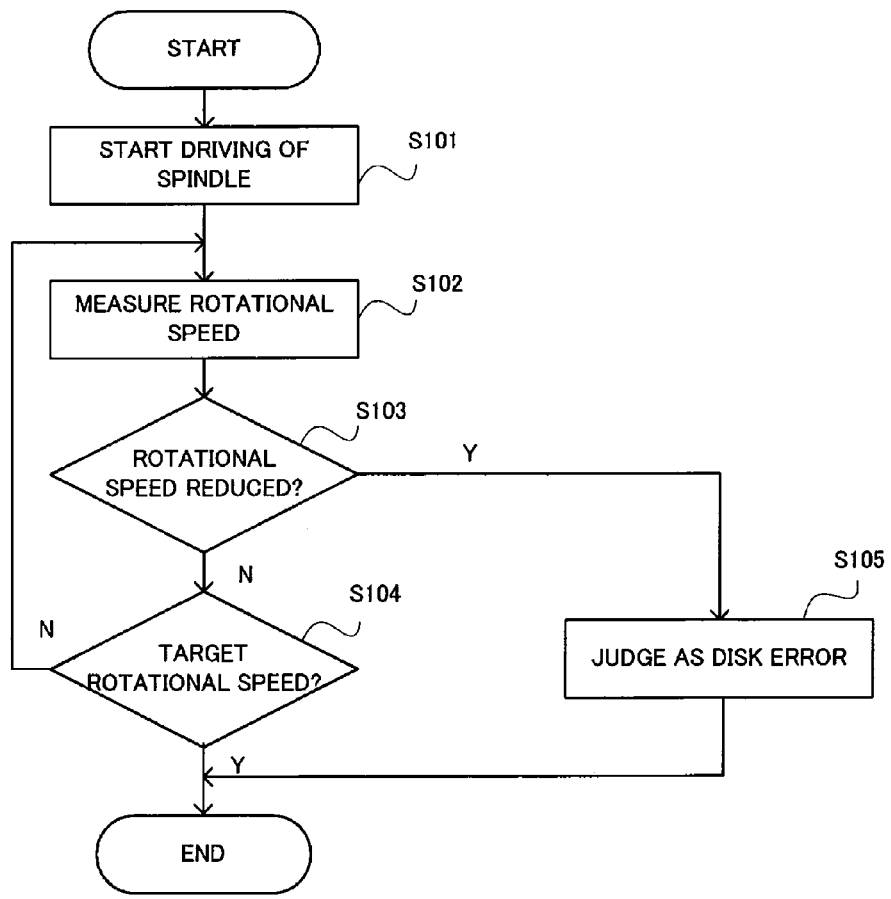
FIG. 4 is a process flowchart of a preferred embodiment of the present invention.
Figure 5:
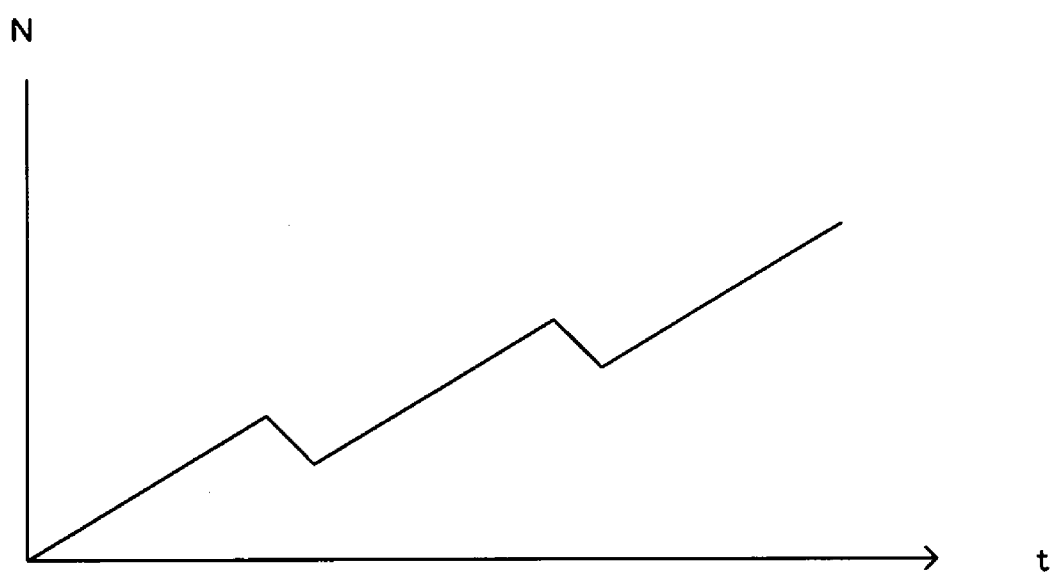
FIG. 5 is an explanatory diagram of a stick-slip.

FIG. 4 shows a flowchart of a detection process in the present embodiment. The drive controller 320 drives the spindle motor 120 to rotationally drive the optical disk D (S101). Then, a rotational speed of the spindle motor 120 is measured (S102). The rotational speed is detected, for example, based on an FG pulse from the spindle motor 120. After the rotational speed is detected, it is judged whether or not the detected rotational speed is reduced during acceleration (S103). This judgment can be executed by sequentially storing the detected rotational speed in a memory of the drive controller 320, and comparing a newly detected rotational speed with a previously detected rotational speed. When the number of loaded optical disk D is 1, the optical disk D is firmly clamped by the magnetic damper and is normally rotationally driven, and therefore, the rotational speed would monotonically increase as the time elapses. When, on the other hand, a plurality of optical disks D, for example two optical disks D, are loaded in a stuck state, the optical disks are not firmly clamped because the clamping force of the magnetic damper is weak, and a stick-slip is caused as the optical disk D is rotationally driven. The stick-slip generally refers to a non-linear vibration phenomenon in which a contact surface (contact surface between the turntable 100 and the optical disk D or contact surface between two optical disks D) are repeatedly stuck (attached) and slipped (slid) as time elapses. When the stick-slip occurs in a plurality of optical disks D, the rotational speed does not monotonically increase, but rather changes in a manner to temporarily be reduced and then increased. FIG. 5 shows an example of a change with respect to time of the rotational speed N of the optical disk D in which the stick-slip has occurred. When the rotational speed is reduced in this manner, it is judged that a plurality of optical disks D are loaded and that a disk error has occurred (S105). The drive controller 320 transmits information indicating that a plurality of optical disks D are loaded to the system controller 16. When the rotational speed is not reduced, it is judged whether or not a target rotational speed has been reached (S104), and the processes of S102-S103 are repeated until the target rotational speed is reached. When the target rotational speed is reached, the detection process is completed.

In this manner, in the present embodiment, the rotational speed is detected and it is judged whether or not the stick-slip has occurred based on reduction in the rotational speed, to detect whether or not a plurality of optical disks D are loaded. With the present embodiment, the loading of the plurality of optical disks D can be quickly and reliably detected.

In the present embodiment, when the system controller 16 receives a disk error, that is, a signal indicating that two optical disks D are loaded, from the drive controller 320, the system controller 16 executes a predetermined error process. The predetermined error process can be arbitrarily set for each system. For example, the two optical disks D may be taken out from the recording unit 15 and a new optical disk D may again be transported, or when a plurality of recording units 15 exist, the operation of the recording unit 15 to which two optical disks D are loaded may be stopped and only the other recording units 15 may be operated.

In the present embodiment, the stick-slip is detected based on reduction of the rotational speed. Alternatively, the stick-slip may be detected based on a non-linear change of the rotational speed. In summary, it is sufficient to detect the stick-slip based on a change with respect to time of the rotational speed or behavior of the rotational speed with respect to time, and detect loading of a plurality of the optical disks D based on the detection of the stick-slip.

In the present embodiment, an optical disk processing system having a recording unit as an optical disk device and a printing unit is exemplified. The present embodiment, however, is not limited to such a configuration, and may be applied to a system in which a plurality of optical disk devices, for example, two optical disk devices, are provided as recording units, the optical disks D are sequentially transported by a transporting function to the recording units, and data is recorded. Such a processing system is a system which can record the same data on a plurality of optical disks D and is sometimes called a duplicator. Two recording units are set as a first recording unit and a second recording unit, an optical disk which is not yet recorded is taken out from a stocker and transported to the first recording unit, and data is recorded. During the data recording, the transporting mechanism takes out the next non-recorded optical disk D from the stocker and transports to the second recording unit. When the data recording in the first recording unit is completed, the transporting unit takes out the recorded optical disk D from the first recording unit and stores in the stocker. The transporting mechanism takes out a non-recorded disk D from the stocker and transports to the first recording unit. When loading of two optical disks D at the first recording unit is detected, the system controller of the duplicator disables the first recording unit and executes the data recording of the optical disk D with only the second recording unit.

What is claimed is:

1. An optical disk device comprising:
   a drive unit configured to rotationally drive a loaded optical disk; and
   a detection unit configured to detect that a plurality of optical disks are loaded, by detecting that a stick-slip has occurred with the plurality of optical disks when a rotational speed of the drive unit is reduced during acceleration.

2. An optical disk processing system comprising:
   the optical disk device according to claim 1; and
   a printing unit configured to print on a label surface of the optical disk, wherein
   the system is configured to consecutively process data recording at the optical disk device and label surface printing at the printing unit.

3. An optical disk processing system comprising:
   a plurality of the optical disk devices according to claim 1, and
   a transporting mechanism configured to transport an optical disk to each of the plurality of the optical disk devices in a predetermined order.

4. A method of detecting that a plurality of optical disks are loaded in an optical disk device, comprising:
   rotationally driving a turntable, which is configured to receive an optical disk, using a driver coupled to the turntable; and
   upon detecting a reduction in a rotational speed of the driver during acceleration, determining that a plurality of optical disks are loaded on the turntable; and
   upon detecting a monotonic increase in the rotational speed of the driver during acceleration, determining that one optical disk is loaded on the turntable.

5. The method according to claim 4, further comprising:
   issuing an error message upon detecting that a plurality of optical disks are loaded on the turntable.

\* \* \* \* \*